United States Patent [19]

Skermetta

[11] 4,042,269
[45] Aug. 16, 1977

[54] SANITARY DEVICE FOR REMOVING ANIMAL DROPPINGS

[75] Inventor: Geraldine J. Skermetta, San Antonio, Tex.

[73] Assignee: Skermetta, Inc., San Antonio, Tex.

[21] Appl. No.: 696,482

[22] Filed: June 16, 1976

[51] Int. Cl.² .................................................. A01K 29/00
[52] U.S. Cl. .................... 294/19 R; 15/257.3; 15/257.6; 294/55
[58] Field of Search ............... 294/1 R, 19 R, 19 A, 294/26.5, 53.5, 55, 69 R; 15/257.1–257.4, 257.6, 257.7, 104.8; 56/332, 333; 119/1

[56] References Cited

U.S. PATENT DOCUMENTS

| 774,994 | 11/1904 | Snedeker | 15/257.3 |
|---|---|---|---|
| 953,756 | 4/1910 | Olson | 15/257.6 |
| 1,053,438 | 2/1913 | Resch | 15/257.3 |
| 1,206,343 | 11/1916 | McConnaughy | 15/257.3 |
| 3,431,008 | 3/1969 | Narita | 294/55 |
| 3,872,831 | 3/1975 | Cassidy | 294/55 X |
| 3,937,509 | 2/1976 | Hufnagel | 294/1 R |

FOREIGN PATENT DOCUMENTS

| 564,654 | 10/1958 | Canada | 15/257.3 |
|---|---|---|---|
| 288,314 | 9/1931 | Italy | 15/257.6 |

Primary Examiner—Johnny D. Cherry

[57] ABSTRACT

A portable toilet for pets consists of a container with a hinged top and bottom connected to a base structure. The hinged top and bottom are biased towards a closed position by a spring interconnected therebetween. A handle extends upwardly from the base structure with a handle grip located on the upper end thereof. Control buttons immediately below the handle grip are connected through wire lines to pivot the hinged top or the hinged bottom to an open position against the closing bias of the spring.

5 Claims, 5 Drawing Figures

SANITARY DEVICE FOR REMOVING ANIMAL DROPPINGS

BACKGROUND OF THE INVENTION

This invention relates to a sanitary device and, more particularly, to a device that may be used to remove the droppings of household pets. For example, when walking a dog, the lightweight sanitary device may be carried in the same manner as a stick or cane. The sanitary device would then be used to pick up or catch the droppings from the dog. Thereafter, the droppings may be disposed of through conventional waste disposal means, such as a commode or garbage can without ever coming into contact with the animal droppings.

BRIEF DESCRIPTION OF THE PRIOR ART

Prior to the present invention, many different types of devices have been suggested for removing waste products or droppings of animals, particularly dogs. Some prior devices are shown in U.S. Pat. Nos. 3,868,135, 3,744,475, 3,767,246 and 3,872,831. The development of such devices has been spurred by cities passing leash laws that require a dog inside the city limits to either be maintained on a leash, or inside an enclosed area, such as a pen. As part of the leash laws, many cities have required that the owner of a dog pick up any droppings from the dog that may occur on public or private property of others. These ordinances are normally directed to the removal of fecal matter, and not urine. Urine does not pose the same health problem as fecal matter because the urine is readily absorbed in the soil or washed away.

Recent studies made by government agencies and private individuals indicate that many different types of illnesses have been spread through the droppings of household pets. Some of these illnesses have even resulted in death to the individual coming in contact with the droppings from the household pets. Some studies indicate there are possibly as many as one hundred million dogs in the United States alone. Individuals who live in large cities must walk their dogs periodically so that the dog may remove body waste such as urine or fecal matter. With the new city ordinances being passed, the individual walking the dog must remove any fecal matter dropped while walking the dog.

SUMMARY OF THE INVENTION

The sanitary device has a container attached to a base structure. Inside of the base structure are located hinge pins about which a hinged top and hinged bottom of the container may rotate. The hinged top and hinged bottom are biased closed by a spring.

Extending upwardly from the base structure is a hollow handle with a handle grip on the upper end thereof. Immediately below the handle grip is located a lower control button that may be moved causing the hinged bottom of the container to open. An upper control button, also immediately below the handle grip, may be moved causing the hinge top of the container to open. Upon release of the control buttons, the hinged bottom and/or the hinged top will close. Both the hinged top and hinged bottom connect through control wires to the upper control button and the lower control button, respectively. The hinged top control wire connects through an upper hinge via a connecting rod to a second hinge that reverses the rotating motion to open the hinged top. The container may be used to catch animal droppings or to scrape up animal droppings such as fecal matter of a dog. The container is particularly designed to receive the standard filter used with automatic home-type coffee brewers. After catching or picking up the animal droppings with the upper control button controlling the hinged top, the lower control button may be moved causing the hinged bottom to open thereby allowing the animal droppings (which could also include the coffee filter) to drop therefrom. The animal droppings may be flushed down a standard household commode without ever touching the animal droppings with the movement of the water cleaning the container. If the flushing of a coffee filter down a commode may cause problems by stopping the drain, a Kleenex, napkin, facial tissue, toilet tissues or any other suitable substance may be used. It should be realized that it is not necessary that any type of filter, etc., be used with the present invention, but is an optional feature thereof. Alternatively, the droppings and filter may simply be dumped into a garbage can.

In the flushing of animal droppings down a commode, the generally conical shaped design causes the water to flow therethrough and rinse the inside surfaces of the container in much the same manner as a commode functions.

DESCRIPTION OF THE PREFERRED EMBODIMENT

Figure 5:
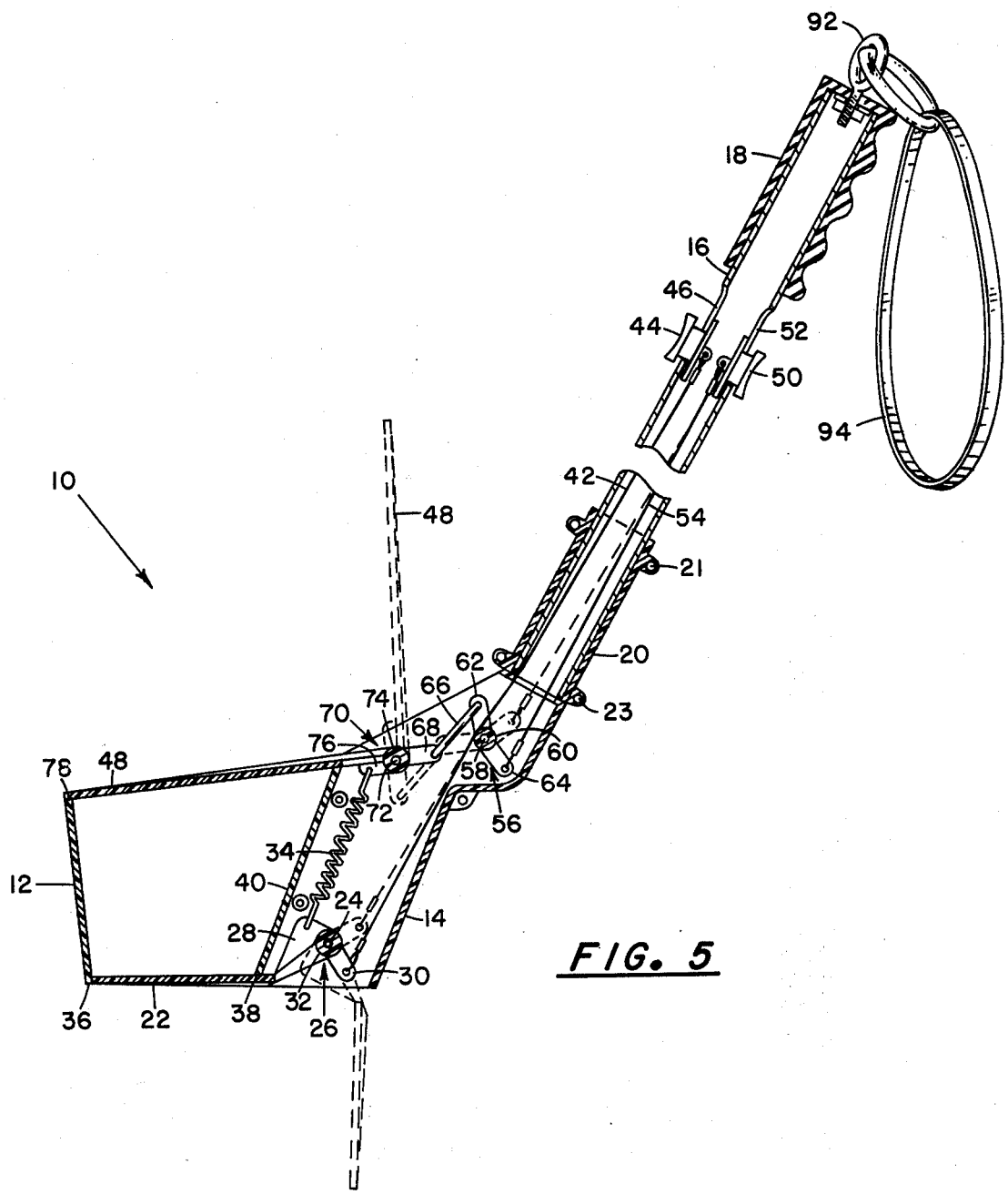
FIG. 5 is an elevated cross-sectional view of the sanitary device.

Referring first to FIG. 5, there is shown a sanitary device represented generally by the reference numeral 10. The sanitary device 10 consists of a container 12 attached to a base structure 14. Extending upwardly from the base structure 14 is a handle 16 having a handle grip 18 on the upper end thereof. Handle 16 is formed from a hollow conduit and is telescopically mounted in upper conduit portion 20 of base structure 14. Bolts 21 and 23 securely clamp the handle 16 inside the base structure 14.

A hinged bottom 22 of the container 12 is pivotally mounted on pin 24 which forms a part of a lower hinge 26. The lower hinge 26 is formed from an extension of the hinged bottom 22 which is received inside of the base structure 14. The extension has the pin 24 extending through a hub portion 32 located between an upwardly extending shoulder 28 and a rearwardly extending tab 30 to form the lower hinge 26. The hub portion 32 pivotally rotates about the pin 24.

The hinged bottom 22 is biased closed by means of spring 34 connected to the upwardly extending shoulder 28. The hinged bottom 22 is designed to be received inside of the lowermost edge 36 of the container 12. The hinged bottom 22 in its closed position is in an abutting relationship with the bottom 38 of rear wall 40 of container 12.

A bottom control wire 42 is connected to rearwardly extending tab 30 and to a lower control button 44 that is slidably mounted in slot 46. As can be seen in FIG. 5, lower control button 44 is normally located at the bottom of slot 46 with the hinged bottom 22 closed and bottom control wire 44 being firmly drawn therebetween. By sliding the lower control button 44 upward in slot 46, the hinged bottom 22 will pivot about the pin 24 as pictorially shown in the dotted lines.

A hinged top 48 covering the container 12 is connected to an upper control button 50 located in slot 52 via top control wire 54. The top control wire 54 is connected to an upper hinge 56 pivotally connected about pin 58. The upper hinge 56 has a hub portion 60 pivotally mounted on pin 58. The hub portion 60 has an upwardly extending tab 62 and a lower rearwardly extending tab 64. The top control wire 54 is firmly drawn between lower rearwardly extending tab 64 and upper control button 50.

The upper hinge 56 is connected from upwardly extending tab 62 by a connecting rod 66 to a rear tab 68 of a second upper hinge 70. The second upper hinge 70 is formed integral with the hinged top 48 for pivotal motion about pin 72 via hub 74. The spring 34 which biases hinged bottom 22 closed, also biases hinged top 48 closed by connecting between a lower flange 76 and upwardly extending shoulder 28.

As can be seen in FIG. 5, the upper control button 50 is located near the bottom of slot 52 if the hinged top 48 is closed. By moving the upper control button 50 upward in slot 52, the top control wire 54 is moved upward thereby pulling lower rearwardly extending tab 64 which causes upper hinge 56 to rotate in a counterclockwise direction. A counterclockwise rotation of upper hinge 56 will cause a clockwise rotation about second upper hinge 70 via upwardly extending tab 62, connecting rod 66 and rear tab 68. The clockwise rotation about second upper hinge 70 will cause the hinged top 48 to open as shown in reference lines. When the hinged top 48 is in the closed position, it rests securely against the top edge 78 of the container 12 including rear wall 40. The hinged top 48 is continually biased towards the closed position by means of spring 34 which is always under tension.

Figure 1:
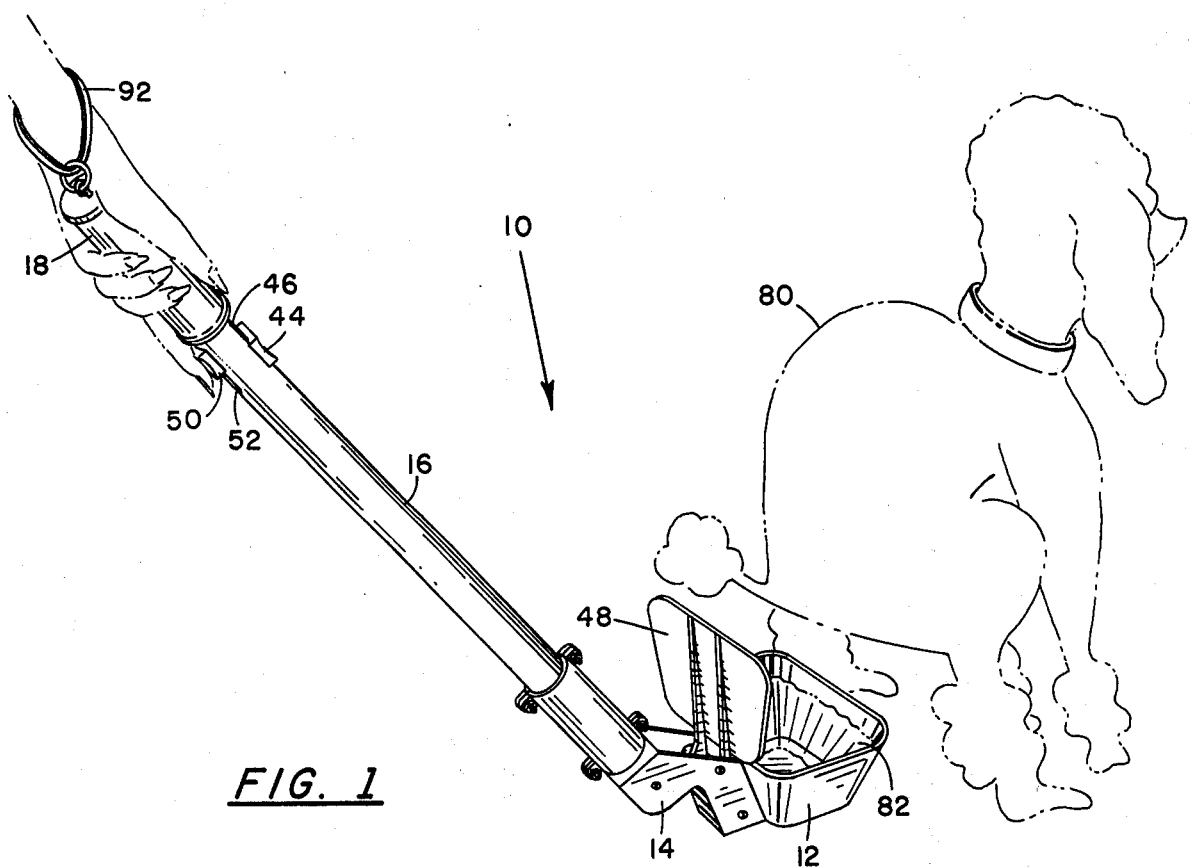
FIG. 1 is a perspective environmental view of the sanitary device being used to catch animal droppings.

Referring now to FIG. 1 of the drawings, there is shown a perspective environmental view of the sanitary device 10 being used to catch the droppings of dog 80 shown in broken lines. The animal droppings, in particular fecal matter, will land in container 12. Inside of container 12 is a filter 82 that may be used to catch the animal droppings. The filter 82 may be a conventional coffee filter purchased off-the-shelf with standard use being in automatic home-type coffee brewers. The filter 82, while not necessary to the present invention, would prevent fecal matter from collecting on the sides of container 12. The filter 82 can also be replaced by any other suitable substance such as a Kleenex, napkin or facial tissue. By simple use of the index finger, the upper control button 50 is moved upward towards the handle grip 18 thereby moving the hinged top 48 in the open position.

Figure 2:
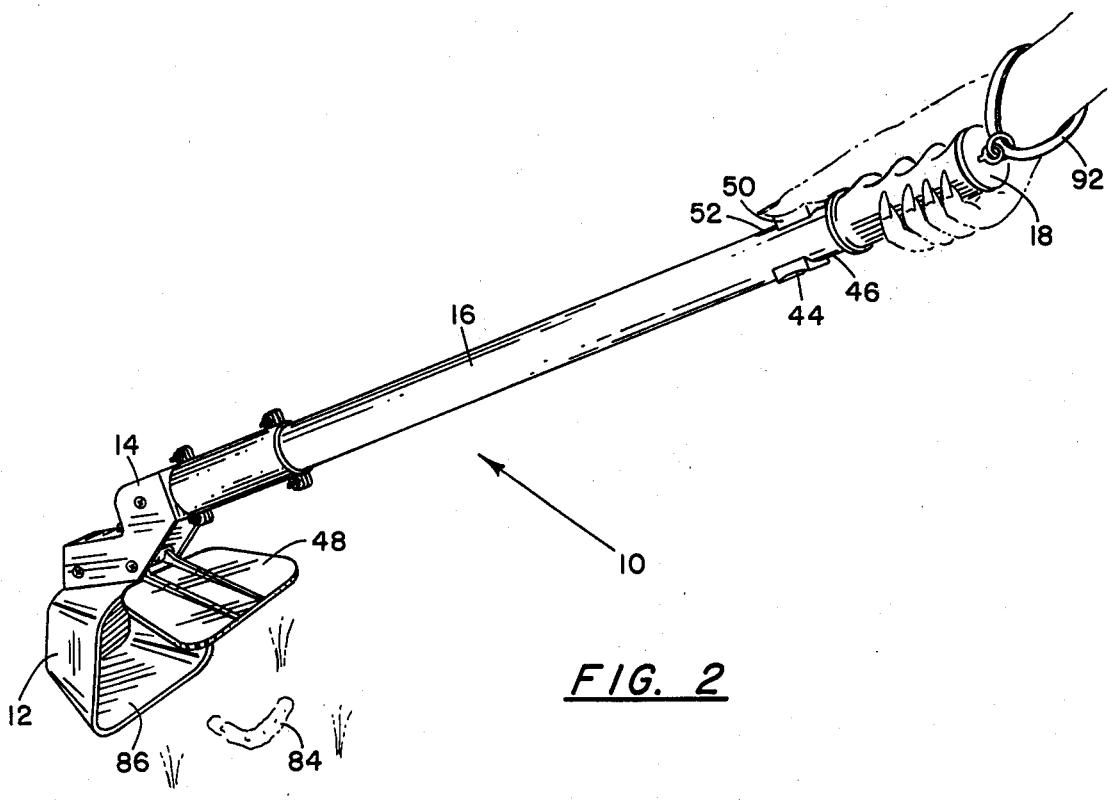
FIG. 2 is a perspective environmental view of the sanitary device being used to pick up animal droppings.

Referring now to FIG. 2, the sanitary device 10 is shown in an environmental view being used to pick up animal droppings from the ground. An individual simply used his thumb to move the upper control button 50 towards the handle grip 18. This causes the hinged top 48 to open, allowing the fecal matter 84 to be picked up in the container 12 by simply scraping the forward edge 86 of the container 12 along the ground. The forward edge 86 is relatively flat for a short distance to aid in the scraping by the container 12 in picking up the fecal matter 84. For the purpose of illustration, the container 12 does not have any type of internal lining, such as the filter 82 shown in FIG. 1. It should be understood that the filter 82 may, or may not, be used according to the particular desires of the individual. The hinged bottom 22 will not open when scraping up the fecal matter 84 because the hinged bottom 22 is recessed inside container 12.

The amount of animal droppings that may be picked up or caught in the container 12 is limited only by the desired size of the entire sanitary device 10 particularly the container 12. A sanitary device 10, such as the one just described, would be more than sufficient for a single walk of a dog to catch any of the fecal matter from the dog. Also, the sanitary device 10 could be used to pick up animal droppings in a yard or pen over the past couple of days.

Figure 3:
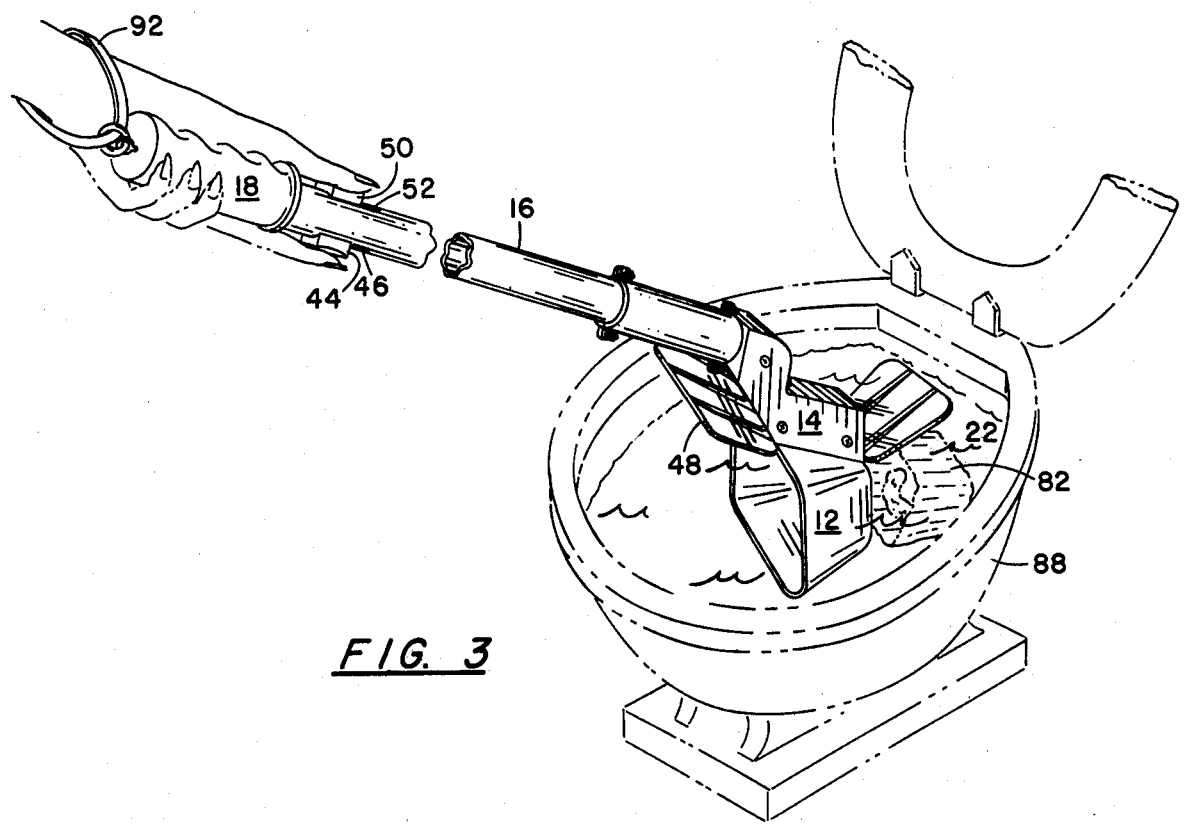
FIG. 3 is a partial perspective view of the sanitary device illustrating removal of the animal droppings into a commode and cleaning of the container.
Figure 4:
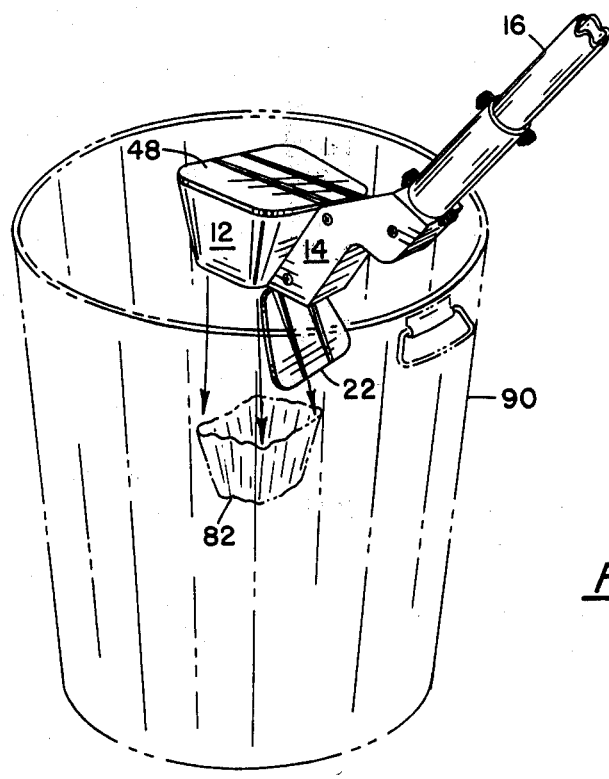
FIG. 4 is a partial perspective view of the sanitary device illustrating removal of the animal droppings into a garbage can.

After the animal droppings are caught or picked up by container 12, they must be disposed of. As is shown in FIG. 3, the entire portion of container 12 that comes in contact with the fecal matter may be emersed in the standard commode 88 shown in reference lines with the filter 82 and the fecal matter 84 being washed down the commode 88. The generally conical shape of the container 12 causes the flushing water flowing therethrough to increase its velocity to provide a better rinsing of the container 12. The action of flushing water in commode 88 will remove any facal matter from the container 12. The hinged top 48 and the hinged bottom 22 are maintained in the open position by pulling the lower control button 44 and upper control button 50 towards the handle grip 18. Another very easy method of disposing of the animal droppings without ever touching any portion of the container 12 that may come in contact with the fecal matter is as shown in FIG. 4. The container 12 is simply held over a trash can 90 by means of handle 16. By moving the lower control button 44 towards the handle grip 18 (not shown), the hinged bottom 22 will open allowing the filter 82 and droppings contained therein to fall into the trash can 90.

The significant part of the present sanitary device is that it is never necessary to touch any of the animal droppings that may be caught or picked up in the container 12. The container 12 may be made from any suitable substance that will wash easily and will not corrode, such as plastic, aluminum, stainless steel or any other type of suitable material. By simple movement of the container 12 back and forth in water such as that contained in commode 88 or flushing action of the commode 88, all residue of the animal droppings will be cleaned from the sanitary device 10.

As an added feature, the handle 12 has a wrist strap 92 connected to handle grip 18 by means of retaining ring 94. The wrist strap 92 allows the sanitary device 10 to be carried suspended from the wrist leaving a person's hands free.

I claim:

1. A sanitary device for removing animal droppings comprising:
    base structure;
    handle means attached to and extending upwardly from said base structure;
    container means attached to and extending generally horizontal from said base structure, said container means having a hinged top and hinged bottom pivotally mounted inside said base structure;

opening means in said handle means operatively connected to said hinged top and hinged bottom, said opening means causing said hinged top to pivot open to receive animal droppings in said container means and said hinged bottom to pivot open to remove animal droppings from said container means, said opening means also being adapted for operation by a single hand for simultaneous opening of said hinged top and said hinged bottom to facilitate cleaning;

biasing means connected to said hinged top and said hinged bottom to urge said hinged top and said hinged bottom toward a closed position.

2. The sanitary device as given in claim 1 wherein said hinged top and hinged bottom have extensions beyond pivot pins on which said hinged top and hinged bottom pivot, said opening means including control mechanisms located in an upper portion of said handle means, said extensions being connected to said control mechanisms in said handle means by wire lines.

3. The sanitary device as given in claim 1 wherein said hinged bottom is received in contiguous relationship inside of outer walls of said container means when said hinged bottom is in the closed position.

4. The sanitary device as given in claim 3 wherein said container means is adapted to receive a liner therein.

5. The sanitary device as given in claim 3 wherein said biasing means is a spring under tension located within said base structure and attached to said hinged top and hinged bottom to urge both toward a closed position.

* * * * *